United States Patent [19]
Ebata

[11] Patent Number: 4,893,917
[45] Date of Patent: Jan. 16, 1990

[54] FRAME STRUCTURE FOR GLASSES HAVING AN EXCELLENT RESTORABILITY

[75] Inventor: Kenji Ebata, Tokyo, Japan
[73] Assignee: Nikon Corporation, Tokyo, Japan
[21] Appl. No.: 171,379
[22] Filed: Mar. 21, 1988
[30] Foreign Application Priority Data
 Mar. 27, 1987 [JP] Japan .............................. 62-45368[U]
[51] Int. Cl.⁴ .......................... G02C 5/14; G02C 5/16; G02C 5/02
[52] U.S. Cl. ...................................... 351/41; 351/121; 351/113; 351/126; 351/130
[58] Field of Search ................. 351/41, 121, 153, 113, 351/126, 129, 130; 16/228

[56] References Cited
U.S. PATENT DOCUMENTS
4,744,646 5/1988 Stewart ................................ 351/153

Primary Examiner—Rodney B. Bovernick
Attorney, Agent, or Firm—Shapiro and Shapiro

[57] ABSTRACT

The frame structure for glasses is constituted by metallic material and includes a pair of rim members for supporting the glasses, a bridge member interposed between the rim members to connect the latter to one another, a pair of temple members and a pair of joint members adapted to connect the temple members to the rim members, respectively. Each of the joint members is fixed to the outside of the corresponding rim member in the proximity of the temple member and has both its end parts fixed to the rim member, and an intermediate part which is free from the rim member. The joint member is formed in an arcuate shape. Alternatively, a pair of joint members may be fixed to a pair of rim members with a bridge member interposed therebetween. Preferably, cobalt-based alloy is employed as the material constituting the joint member.

13 Claims, 2 Drawing Sheets

FRAME STRUCTURE FOR GLASSES HAVING AN EXCELLENT RESTORABILITY

BACKGROUND OF THE INVENTION

1. Field of the Invention

The present invention relates to a frame structure for glasses which exhibits an excellent restorability when a certain intensity of force for expanding temples outwardly is exerted on the frame structure.

2. Related Background Art

A conventional frame structure made of metallic material for glasses is schematically illustrated in FIG. 2 which is a perspective view of the frame structure. As is apparent from the drawing, a pair of lugs 2 are fixedly secured to a pair of rims 1 and a pair of temples 3 are hinged to the pair of lugs 2. The pair of rims 1 are connected to one another with the aid of a bridge 5 which is interposed therebetween. Each of the lugs 2 is a member for pivotally connecting the rim 1 to the temple 3.

Anytime that a wearer removes a frame structure such as that just described, the frame structure may be subjected to an excessive force which expands the temples 3 outwardly. Such excessive force may also be exerted on the temples 3 when the wearer collides against some object or as the result of similar accident. At such times, the force is transmitted to the rims 1 via the lugs 2, causing particularly a part of the rim 1 located in the proximity of a fixed part of the lug 2 (usually, a soldered part) as well as another part of the rim 1 located in the proximity of a jointed part of the lug 2 (usually, a soldered part) to be deformed. As a result, the lenses are loaded. In an extreme case, they may be damaged or broken. Further, in a case where the temples 3 are excessively expanded outwardly, they remain in an expanded state due to permanent deformation of the rims 1, and therefore they fail to resume their original state in other words, they lose their restorability. When the rims 1 are subjected to repeated deformation, they tend to break at the position where deformation occurs.

SUMMARY OF THE INVENTION

The present invention has been made with the foregoing background in mind and its object resides in providing a frame structure for glasses which assures that rims are not deformed even when temples are excessively expanded outwardly (thus, avoiding) danger of breakage of the lenses, which is excellent in restorability and which avoid rim breakage as a result of repeated deformation.

To accomplish the above object, there is provided according to one aspect of the invention a frame structure for glasses having an excellent restorability wherein a pair of resilient arcuate joint members made of alloy are fixedly secured to the outside of a pair of rims in the proximity of temples, a pair of lugs are fixed to the joint members, and a pair of temples are hinged to the pair of lugs.

Further, there is provided according to another aspect of the invention a frame structure for glasses having an excellent restorability wherein a pair of resilient arcuate joint members made of alloy are fixedly secured to the outside of a pair of rims in the proximity of a bridge, and the pair of rims are connected to one another with the bridge fixed to the joint members interposed therebetween.

When the frame structure of the invention is used, rim deformation stress developed via the lugs when the temples are excessively expanded outwardly is absorbed by deformation of the joint members (mainly, twisting of the same) Each joint member has opposite ends fixedly secured to the rim and an intermediate part entirely free from the rim. Thus, no load is imparted to either the rims or the bridge.

The joint member may be constituted either by a single wire or by a plurality of wires. It is preferable that it is constituted by two wires.

A wire having a small diameter may be employed for the joint member. Generally, a wire having a cross-sectional area in the range of 0.28 to 3 mm$^2$ is preferred. If the wire has a cross-sectional area smaller than 0.28 mm$^2$, it becomes excessively soft, resulting in rim deformation stress being absorbed at a reduced efficiency. On the contrary, if it has a cross-sectional area larger than 3 mm$^2$, it has an increased rigidity, and the absorption effect tends to be reduced.

A cross-sectional shape of the wire may be circular, elliptic or rectangular or may assume other contour. However, based on considerations of availability and ease of production, it is preferable that the wire has a circular cross-sectional shape.

If circumstances require, the wire may be produced in the form of a coin.

It is preferable that the wire has a length longer than 10 mm from the viewpoint of absorption of deformation stress.

The wire is fixedly secured to the rim by soldering or welding its both ends to the rim. Further, in the first embodiment of the invention, the wire is fixed to the lug by soldering or welding. In the second embodiment of the invention, it is fixed to the bridge by employing the same process.

Suitable alloys for the wire include, for instance, copper alloy such as beryllium copper alloy, phospher bronze, nickel silver, copper-nickel-manganese alloy or the like, ferrous material such as 18-8 stainless steel, 17-7 PH stainless alloy or the like, nickel-chromium alloy, and cobalt based alloy. Among the foregoing, cobalt-based alloy is preferably employed, because it is excellent in corrosion resistance and characteristics of resiliency, easy to be soldered or welded, and moreover unlikely to be locally annealed during soldering or welding operation.

The wire may be plated with chromium or precious metal in order to improve corrosion resistance and aesthetic property. Further, in order to increase corrosion resistance and aesthetic property, coating may be employed in place of plating or in addition to plating.

DESCRIPTION OF THE PREFERRED EMBODIMENTS

The present invention will now be described in greater detail with reference to the accompanying drawings which illustrate preferred embodiments thereof.

Figure 1:
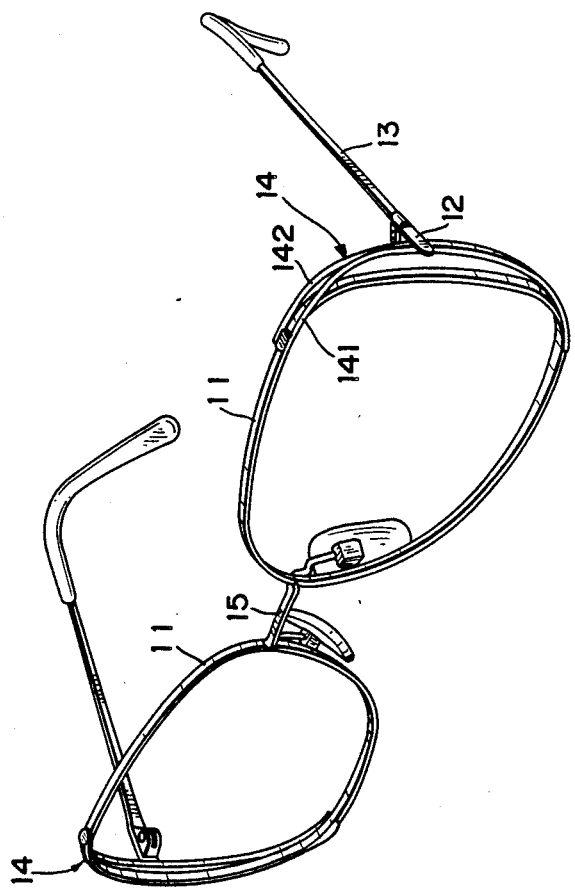
FIG. 1 is a schematic perspective view of a frame structure for glasses in accordance with a first embodiment of the present invention.
Figure 2:
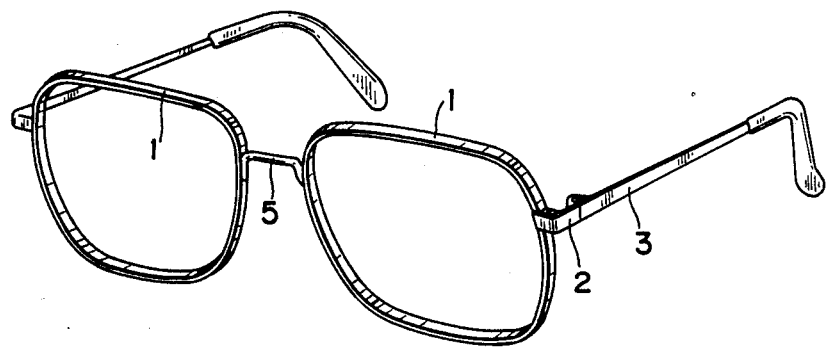
FIG. 2 is a schematic perspective view of a conventional frame structure for glasses.

FIG. 1 is a schematic perspective view of a frame structure made of metallic material for glasses in accordance with a first embodiment of the invention. The frame structure for glasses is composed of a pair of rims 11, a pair of arcuate resilient joint members 14 attached to the outside of the rims 11 in the proximity of temples, a pair of lugs 12 soldered to the joint members 14, a pair of temples 13 soldered to the lugs 12 and a bridge 15 by way of which the pair of rims 11 are connected to one another.

The joint members 14 are made of cobalt-based alloy and each of the joint members 14 comprises two wires 141 and 142 each of which has a circular cross-sectional shape having a cross-sectional area of 0.5 mm$^2$ and has a length of about 70 mm. The upper end of each of the wires 141 and 142 is soldered to the upper part of the rim 11, while the lower end of each wire is soldered to the lower part of the rim 11. The clearance between the two wires 141 and 142 is narrowed at the intermediate part thereof, but this is merely for purposes of appearance.

When a certain intensity of force is exerted on the frame structure to expand the temples 13 outwardly, the joint mumbers 14 twist under the effect of the force. As a result of such twisting, the a deformation stress developed by the aforesaid force is absorbed by the joint members 14 Thus, no stress is exerted on the rims 11 and the bridge 15. When freed, the temples 13 will readily turn inwardly under the effect of resiliency of the joint members 14 to resume their original position. It should be noted that the frame structure of the invention has such an excellent restorability that the temples 13 can resume the original state even if intentionally expanded outwardly by an angle of about 180 degrees so as to lie substantially in the same plane.

Figure 3:
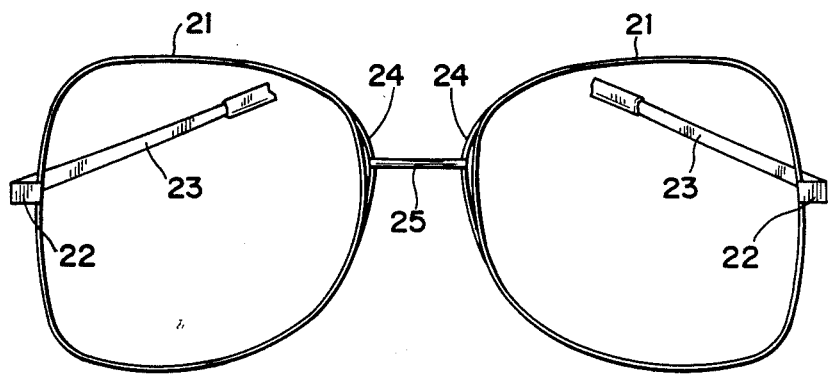
FIG. 3 is a schematic front view of a frame structure for glasses in accordance with a second embodiment of the present invention.

FIG. 3 is a schematic front view of a frame structure made of metallic material in accordance with a second embodiment of the present invention. The frame structure is composed of a pair of rims 21, a bridge 25, a pair of arcuate resilient joint members 24 attached to the outside of the rims 21 in the proximity of the bridge, the ends of the bridge being soldered to the middle parts of the joint members 24, a pair of lugs 22 soldered to the respective side faces of the rims 21 and a pair of temples 23 hinged to the lugs 22.

Each of the joint members 24 is constituted by a single wire of diameter and material identical to those in the preceding embodiment. They have a shorter length, however, that they have a short length of about 15 mm.

When a certain intensity of force is exerted on the frame structure to expand the temples 23 outwardly, it is transmitted to the joint members 24 via the rims 21, causing the joint members 24 to be twisted. The a deformation stress developed by this force is thus absorbed by the joint members 24 wherefore such stress is not exerted on the rims 21 and the bridge 25. When freed, the temples 23 are retracted inwardly under the effect of resiliency of the joint members 24 until they resume the original state.

It will be appreciated that the foregoing two embodiments of the invention may be combined in a single frame structure. More particularly a pair of joint members may be attached to the outside of a pair of rims in the proximity of the temples, with a pair of lugs being fixedly secured to the joint members in the same manner as in the first embodiment, while another pair of joint members are attached to the outside of the rims in the proximity of a bridge so that the rims are connected to one another via the joint members with the bridge disposed therebetween in the same manner as in the second embodiment.

Of course, other changes are also possible in keeping with the principles of the invention, the scope of which is defined in the appended claims.

I claim:

1. A frame structure for eyeglasses, comprising:
   a pair of rims adapted to support respective lenses,
   a bridge interposed between said rims and connecting said rims to one another,
   a pair of temple members, and
   a pair of resilient metal wire means for connecting said pair of temple members to said pair of rims, respectively,
   each of said resilient metal wire means being of arcuate shape extending alongside a periphery of the corresponding rim and having opposite end parts secured to the periphery of said rim and an intermediate part spaced outwardly from said rim,
   each of said temple members being secured to said intermediate part of the corresponding resilient metal wire means.

2. The frame structure of claim 1, wherein said opposite end parts of each resilient metal wire means extend in a circumferential direction of the corresponding rim.

3. The frame structure of claim 1, wherein each resilient metal wire means comprises a pair of arcuate wires arranged substantially beside one another.

4. The frame structure of claim 1, wherein the respective resilient metal wire means are constituted by cobalt-based alloy.

5. The frame structure of claim 1, wherein each resilient metal wire means is made of wire having a cross-sectional area in the range of 0.28–3 mm$^2$.

6. A frame structure for eyeglasses, comprising:
   a pair of rims adapted to support respective lenses,
   a bridge interposed between said rims and connecting said rims to one another,
   a pair of temple members, and
   a pair of joint means for connecting said pair of temple members to said pair of rims, respectively,
   each of said joint means including a resilient thin metal wire having opposite end parts secured to a periphery of the corresponding rim and an intermediate part spaced from the periphery of said rim,
   each of said resilient thin metal wires being sufficiently flexible relative to said rim such that forces tending to expand the temple members outwardly are largely absorbed through deformation of the joint means rather than being transmitted to the rims.

7. The frame structure of claim 6, wherein said joint means are of arcuate shape and extend alongside the peripheries of the corresponding rims.

8. The frame structure of claim 6, wherein said opposite end parts of each resilient thin metal wire extend in a circumferential direction of the corresponding rim.

9. The frame structure of claim 6, wherein said resilient thin metal wires are constituted by cobalt-based alloy.

10. The frame structure of claim 6, wherein each resilient thin metal wire has a cross-sectional area in the range of 0.28–3 mm$^2$.

11. A frame structure for eyeglasses, comprising:
    a pair of rims adapted to support respective lenses, a bridge interposed between said rims and connecting said rims to one another,
a pair of temple members, and
a pair of resilient metal wire members adapted to connect said pair of temple members to said pair of rims, respectively,
each of said metal wire members having opposite end parts secured to a periphery of the corresponding rim and an intermediate part spaced from said rim, and being sufficiently flexible relative to said rim such that forces tending to expand the temple members outwardly are largely absorbed through deformation of the metal wire members rather than being transmitted to the rims.

12. The frame structure of claim 11, wherein said metal wire members are of arcuate shape and extend alongside the peripheries of the corresponding rims.

13. The frame structure of claim 11, wherein said opposite end parts of each metal wire member extend in a circumferential direction of the corresponding rim.

* * * * *